US007819407B1

(12) United States Patent  (10) Patent No.: US 7,819,407 B1
Charitun  (45) Date of Patent: Oct. 26, 2010

(54) CART FOR TRANSPORTING BEACH ACCESSORIES AND ASSOCIATED METHOD

(76) Inventor: Marian Charitun, 1113 Westminster Blvd., Parlin, NJ (US) 08859

( * ) Notice: Subject to any disclaimer, the term of this patent is extended or adjusted under 35 U.S.C. 154(b) by 347 days.

(21) Appl. No.: 12/215,657

(22) Filed: Jun. 30, 2008

(51) Int. Cl.
*B62B 1/04* (2006.01)
(52) U.S. Cl. .................. 280/47.18; 280/47.19; 280/652
(58) Field of Classification Search ............. 280/490.1, 280/491.1, 491.2, 47.131, 47.17, 47.18, 47.19, 280/47.24, 47.27, 47.315, 638, 645, 652, 280/654, 655, 43.1
See application file for complete search history.

(56) References Cited

U.S. PATENT DOCUMENTS

| | | | | | |
|---|---|---|---|---|---|
| 2,476,539 | A | * | 7/1949 | Fortin | 414/453 |
| 3,754,771 | A | * | 8/1973 | Shagoury | 280/654 |
| 3,907,322 | A | * | 9/1975 | Kiryu | 280/654 |
| 3,998,476 | A | * | 12/1976 | Kazmark, Sr. | 280/655 |
| 4,094,391 | A | * | 6/1978 | Ratchford | 190/18 A |
| 4,263,984 | A | * | 4/1981 | Masuda et al. | 182/113 |
| 4,286,796 | A | * | 9/1981 | Esposito | 280/47.27 |
| 4,373,737 | A | * | 2/1983 | Cory et al. | 280/30 |
| 4,561,674 | A | * | 12/1985 | Alessio | 280/655 |
| 4,795,186 | A | * | 1/1989 | Tyus | 280/651 |
| 4,846,485 | A | * | 7/1989 | Payne | 280/47.18 |
| 4,858,940 | A | * | 8/1989 | Cheng | 280/5.2 |
| 4,865,346 | A | * | 9/1989 | Carlile | 280/654 |
| 4,907,674 | A | * | 3/1990 | Miller | 182/150 |
| 5,106,112 | A | * | 4/1992 | Sargent | 280/40 |
| 5,123,666 | A | * | 6/1992 | Moore | 280/47.28 |
| 5,127,664 | A | * | 7/1992 | Cheng | 280/655 |
| 5,178,404 | A | * | 1/1993 | Chen | 280/655 |
| D342,363 | S | * | 12/1993 | Stein | D34/26 |
| 5,308,103 | A | * | 5/1994 | Chin-Shung | 280/655 |
| 5,351,984 | A | * | 10/1994 | Cheng | 280/655 |
| 5,641,170 | A | * | 6/1997 | Helm | 280/30 |
| 5,697,624 | A | * | 12/1997 | Faraj | 280/47.19 |
| 5,799,958 | A | * | 9/1998 | Bishop | 280/47.26 |
| 5,913,527 | A | * | 6/1999 | Hailston | 280/47.28 |
| 6,082,757 | A | * | 7/2000 | Lin | 280/654 |
| 6,113,129 | A | * | 9/2000 | Marques et al. | 280/654 |
| 6,135,466 | A | * | 10/2000 | Irwin | 280/47.28 |
| 6,161,861 | A | * | 12/2000 | Ivie | 280/655 |
| 6,223,392 | B1 | * | 5/2001 | Chang | 16/113.1 |
| 6,247,710 | B1 | * | 6/2001 | Luberda | 280/47.28 |
| 6,601,859 | B2 | * | 8/2003 | Durham | 280/47.131 |
| 6,666,465 | B2 | * | 12/2003 | Chan | 280/47.26 |
| 7,014,199 | B2 | * | 3/2006 | Hendzel | 280/47.35 |
| 2001/0007387 | A1 | * | 7/2001 | Gomez | 280/47.17 |
| 2001/0015535 | A1 | * | 8/2001 | Weck et al. | 280/47.315 |

(Continued)

*Primary Examiner*—J. Allen Shriver, II
*Assistant Examiner*—Brodie Follman

(57) ABSTRACT

A cart assembly includes a frame that has an axle extending across a lower end thereof. Handles are included that have slotted and telescoping upper and lower sections. A transport platform is pivotally connected to each handle base and the axle, and folds against the handles. The platform has an arm wrapped about a major axle circumference. The arm has a gap formed therein. A horizontal support bar is positioned at an assembly top end, and is vertically raised and lowered for adjusting an assembly height. Horizontal members are included that form a part of the frame and extend between the handles below the horizontal support bar. Each horizontal member has hooks rotatably mounted therearound and further is slidably displaced along longitudinal lengths of the horizontal members. Wheels are rotatably mounted about opposed axle ends. A mechanism is included for prohibiting the platform from biasing downwardly from a raised position.

16 Claims, 7 Drawing Sheets

U.S. PATENT DOCUMENTS

| | | | |
|---|---|---|---|
| 2004/0032101 A1* | 2/2004 | Oliver | 280/47.24 |
| 2005/0104308 A1* | 5/2005 | Barnes | 280/47.24 |
| 2006/0157944 A1* | 7/2006 | Alexander | 280/47.18 |
| 2006/0186623 A1* | 8/2006 | Cox et al. | 280/47.17 |
| 2007/0063467 A1* | 3/2007 | Hurtgam | 280/47.24 |
| 2007/0063468 A1* | 3/2007 | Hurtgam | 280/47.24 |
| 2008/0143069 A1* | 6/2008 | Richards et al. | 280/47.35 |
| 2010/0078233 A1* | 4/2010 | Fletcher et al. | 180/19.1 |

* cited by examiner

CART FOR TRANSPORTING BEACH ACCESSORIES AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to transport carts and, more particularly, to a cart for transporting beach accessories and associated method for providing users with a convenient means of hauling multiple items across beach sand and other uneven/difficult-to-traverse terrains.

2. Prior Art

A day at the beach, especially when one has to escort and guide young children, can be a daunting task, having to carry a variety of items, ranging from a cooler, blankets, towels, umbrellas, toys, etc., while keeping a watchful eye on the children. Being faced with all these challenges can even make parents think twice before agreeing to a day at the beach. Any accessory that makes this task easier is a welcome item to a family seeking to enjoy a day of sand, sun and water. However, even items that have to be carried can be a burden to the user. Unfortunately, most such beach accessories have to be carried.

One prior art example shows a rolling cart that is suitable for receiving and transporting a variety of items over loose ground, such as the sand of a beach. Such a rolling cart includes a pair of large ring wheels that exhibit a large footprint for easy movement over and through sand, and is characterized by a high center of gravity to facilitate handling. Disposed between the wheels is a basket assembly that mounts plural rollers which cooperate with the inner wall of the wheels to maintain a generally fixed orientation during movement of the wheels. Unfortunately, the design of the large ring wheels and the rollers is deficient in the aspect that debris, like sand, rocks and sticks, can become wedged between the rollers and the ring wheels. This leads to an inconsistent/rough rolling action of the ring wheels, and in a worst case scenario can completely bind up the ring wheels and render the assembly useless.

Accordingly, a need remains for a cart for transporting beach accessories and associated method in order to overcome the above-noted shortcomings. The present invention satisfies such a need by providing an assembly that is convenient and easy to use, is durable yet lightweight in design, is versatile in its applications, and provides beach goers and the like a simple and efficient means of transporting their goods to the beach. By eliminating the need to make several trips from the car to the beach, simply to unload a day's worth of beach accessories, the present invention effectively holds a myriad of large and small accessories necessary for a day in the sun. Users appreciate that with the apparatus, they can transport a full-sized cooler, sand pails and other toys, blankets, towels and even a beach chair and umbrella, all in one trip.

Additionally, because users can transport all of their beach goods at one time, use of the present invention eliminates the worry associated with leaving transported goods and children unattended while returning to the vehicle for another load. By sparing the user the exhausting hassle of trekking across burning sand in order to transport all the necessary items to the beach, the present invention proves particularly useful for those who suffer with back pain or limited mobility.

BRIEF SUMMARY OF THE INVENTION

In view of the foregoing background, it is therefore an object of the present invention to provide an assembly for allowing a user to more easily transport a plethora of items during a day at the beach or in the out doors. These and other objects, features, and advantages of the invention are provided by a cart for transporting beach accessories and associated method.

In a preferred embodiment of the present invention, a cart assembly for allowing a user to easily transport a plurality of chairs preferably includes a frame that has a rectilinear axle extending transversely across a lower end of the frame. A plurality of handles may be included that effectively form sides of the frame. Each of the handles preferably has an upper section and a lower section. Such upper sections may be telescopically connected to the lower sections and are slidably adapted along a vertical direction. The upper sections and the lower sections preferably have a plurality of slots engraved therein.

The assembly preferably also includes a transport platform that is pivotally and directly connected to a base of each of the handles and about the axle. Such a transport platform may be configured to fold against the plurality of handles by being articulated about a fulcrum axis defined along the axle. The transport platform preferably has a curvilinear arm wrapped about a major circumference of the axle. Such an arm may also have a gap formed therein wherein a portion of the axle becomes covered and uncovered by the arm during rotation of the transport platform.

The assembly may further include a horizontal support bar that is monolithically formed with the plurality of handles. Such a horizontal support bar is preferably positioned at a top of the cart assembly. The horizontal support bar may effectively be raised and lowered along the vertical direction for conveniently adjusting a height of the cart assembly.

The assembly may also include a plurality of horizontal members that form a part of the frame and intermediately extend between the plurality of handles below the horizontal support bar. Each of the horizontal members preferably has a plurality of hooks rotatably mounted therearound and further is slidably displaced along respective longitudinal lengths of the horizontal members. Each of the hooks preferably includes first and second telescopically connected sections.

The first section may be directly and fixedly attached to the bracket. The second section is preferably slidably adapted between extended and retracted positions defined along a linear path. Such a linear path is disposed subjacent and orthogonal to the longitudinal length of the horizontal members such that a single chair is engaged from a stack of chairs when the second section is adapted to the retracted position. A plurality of chairs are engaged from a stack of chairs when the second section is adapted to the extended position. Each of the horizontal members may further include an opening formed at axially opposed sides thereof. The openings may selectively be aligned with the plurality of slots of the upper section and the lower section of the handle. A bracket is preferably mounted about the horizontal members in such a manner that the bracket is simultaneously rotatable about the horizontal members while being slidably displaced along a longitudinal length of the horizontal members respectively.

The assembly further may also include a plurality of wheels rotatably mounted about linearly opposed ends of the axle. Such wheels are preferably positioned on a bottom surface of a rear side of the transport platform such that the transport platform advantageously and effectively remains balanced along a horizontal plane while pivoted to a lowered position. Each of the plurality of wheels may be mounted on the axle of the frame via a sealed bearing. Such a sealed bearing includes a plurality of coextensively shaped ball bearings that are dynamically housed therein such that the ball bearings effectively freely move along a concentric path defined about the axle.

The assembly preferably further includes a mechanism for selectively prohibiting the transport platform from biasing downwardly from a raised position. Such a selectively prohibiting mechanism preferably includes a resilient spring member. A release pin may be coupled to the spring member. The spring member preferably has a first end anchored to the axle and further has an opposite second end attached directly to the release pin. The release pin may be urged inwardly along a radial path to a retracted position when the portion of the axle is covered by the arm. Such a release pin travels outwardly along the radial path to an extended position when the arm uncovers the portion of the axle. The retracted and extended positions are defined when the spring member is compressed and at equilibrium respectively.

The cart assembly preferably further includes a plurality of locking bolts that are directly and adjustably attached to each of the handles. Such a plurality of locking bolts may be adapted along respective linear travel paths registered parallel to the axle to effectively lock each of the handles at a selected position on the frame. The selected position is defined at an intersection of corresponding ones of the slots on the upper and lower sections respectively. The plurality of locking bolts may further be adapted to lock each of the horizontal members at a particular position on the frame. Selected ones of the locking bolts simultaneously locks the upper and lower sections as well as the horizontal members to the frame when the openings are aligned with the slots respectively.

A method for easily transporting a plurality of chairs includes the steps of: providing a frame that has a rectilinear axle extending transversely across a lower end of the frame and forming sides of the frame by providing a plurality of handles. Each of the handles has an upper section and a lower section, and the upper sections and the lower sections have a plurality of slots engraved therein. The method further includes the steps of telescopically connecting the upper sections to the lower sections by slidably adapting the upper and lower sections along a vertical direction; providing and pivotally connecting a transport platform directly to a base of each of the handles and about the axle; and folding the transport platform against the plurality of handles. Such a step of folding the transport platform includes the steps of articulating the transport platform about a fulcrum axis defined along the axle, and providing and wrapping a curvilinear arm about a major circumference of the axle. Such an arm has a gap formed therein wherein a portion of the axle becomes covered and uncovered by the arm during rotation of the transport platform respectively.

The method also includes the steps of providing a horizontal support bar that is monolithically formed with the plurality of handles, the horizontal support bar is positioned at a top of the cart assembly; raising and lowering the horizontal support bar along the vertical direction for adjusting a height of the cart assembly; and providing and intermediately extending a plurality of horizontal members between the plurality of handles below the horizontal support bar for forming a part of the frame. The method additionally includes the steps of providing and rotatably mounting a plurality of hooks around each of the horizontal members while slidably displacing the hooks along respective longitudinal lengths of the horizontal members; providing and rotatably mounting a plurality of wheels about linearly opposed ends of the axle, the wheels are positioned on a bottom surface of a rear side of the transport platform such that the transport platform remains balanced along a horizontal plane while pivoted to a lowered position; and selectively prohibiting the transport platform from biasing downwardly from a raised position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
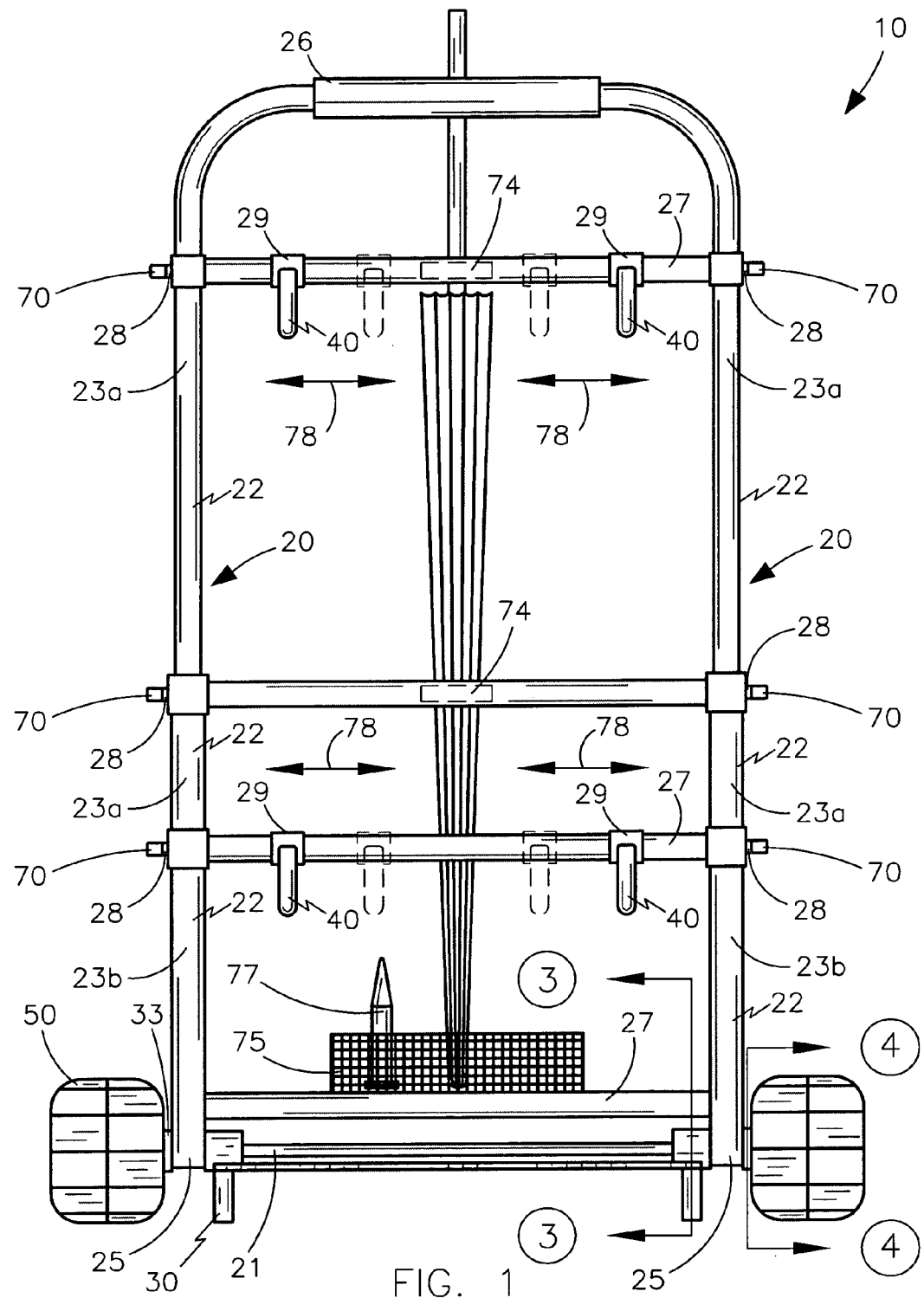
FIG. 1 is a front-elevational view showing a cart for transporting beach accessories, in accordance with the present invention.
Figure 2A:
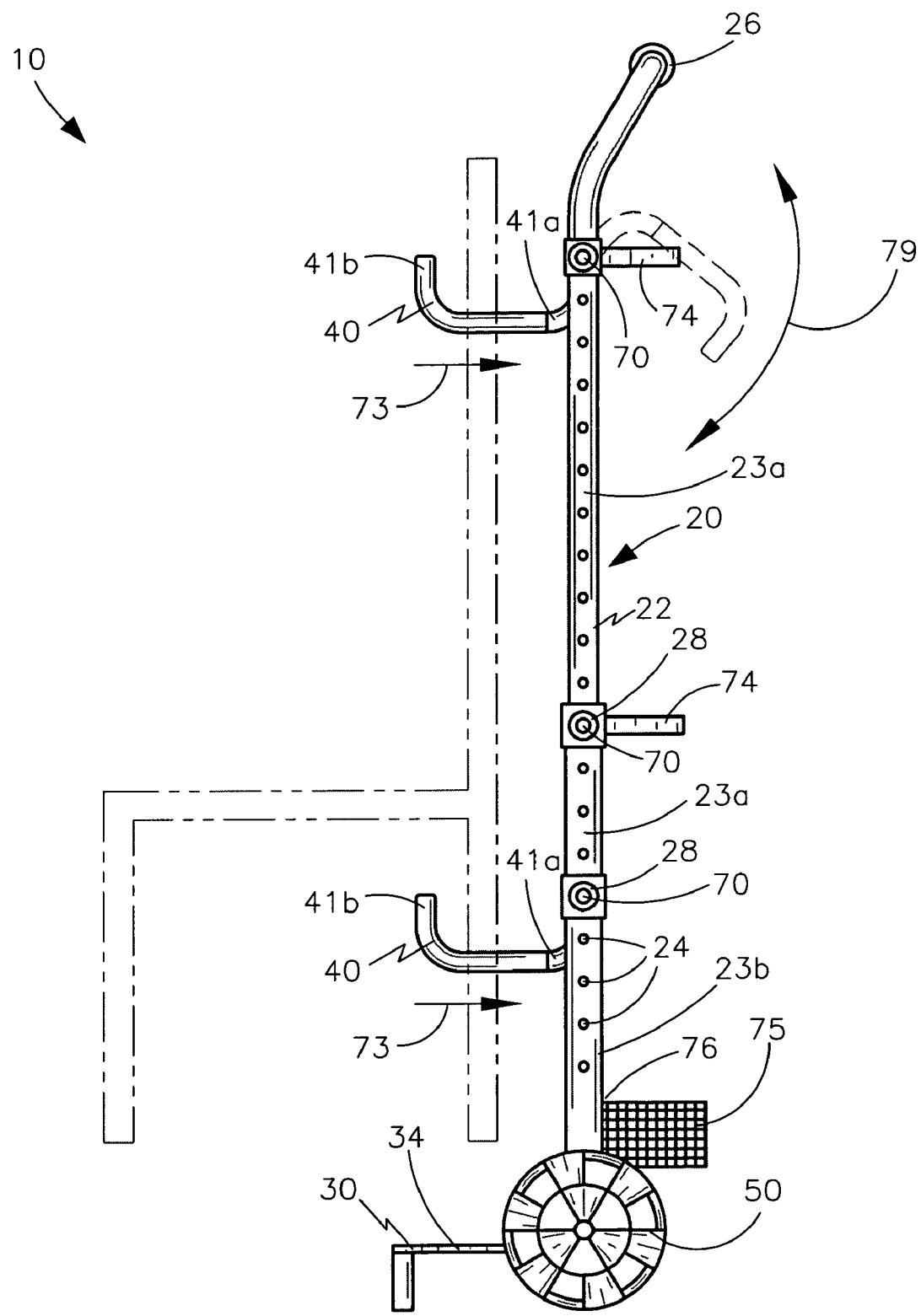
FIG. 2a is a side-elevational view of the assembly shown in FIG. 1, showing the hook sections at a retracted position when transporting one chair.
Figure 2B:
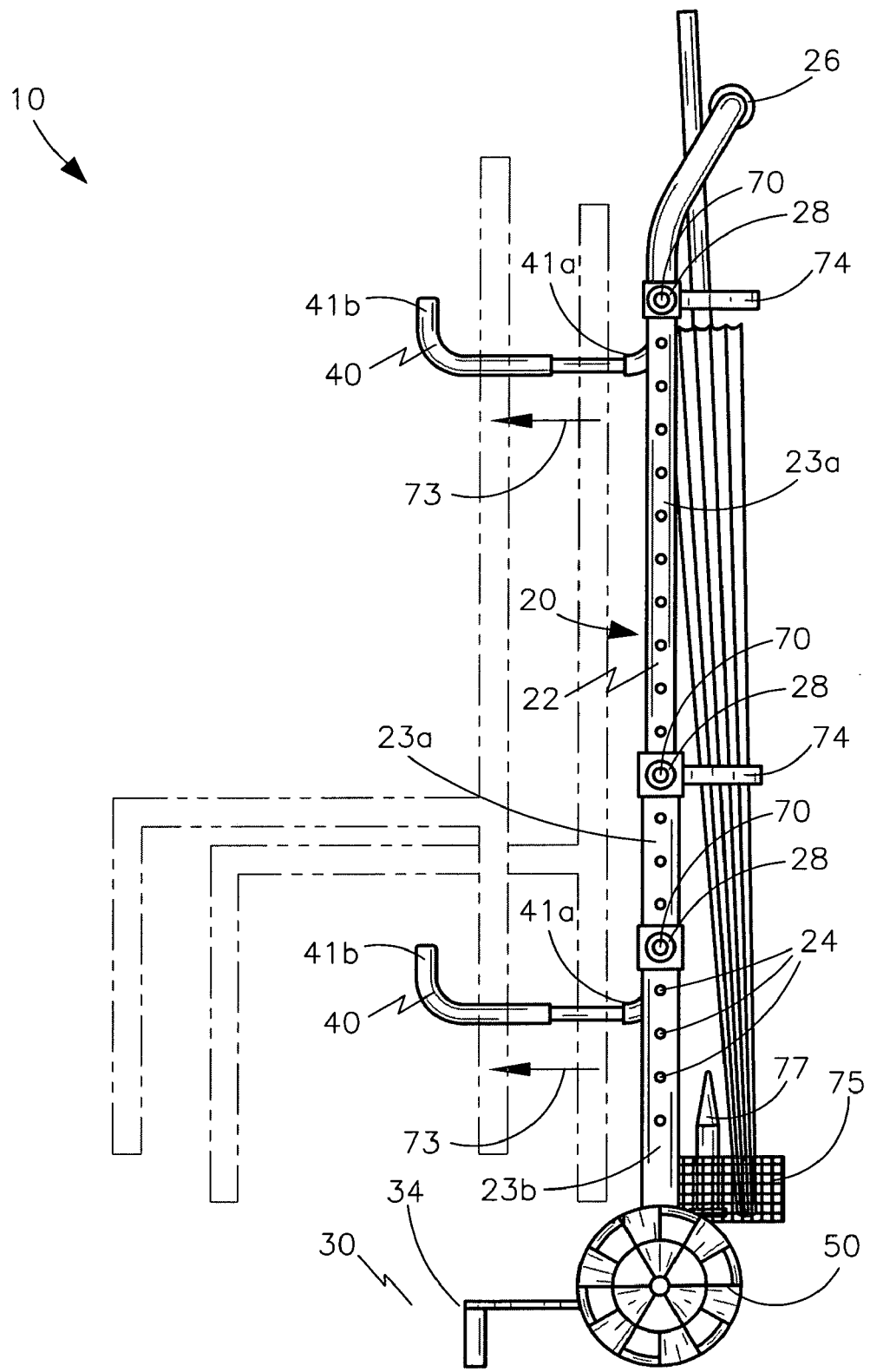
FIG. 2b is a side elevational view of the assembly shown in FIG. 1, showing the second hook sections at an extended position when transporting two chairs.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-5 by the reference numeral 10 and is intended to provide a cart for transporting beach accessories and associated method. It should be understood that the assembly 10 may be used to transport many different types of items and should not be limited to only transporting beach accessories.

Referring initially to FIGS. 1, 2a, 2b and 5, a cart assembly 10 for allowing a user to easily transport a plurality of chairs preferably includes a frame 20 that has a rectilinear axle 21 extending transversely across a lower end of the frame 20. A plurality of handles 22 may be included that effectively form sides of the frame 20. Each of the handles 22 preferably has an upper section 23A and a lower section 23B. Such upper sections 23A may be telescopically connected to the lower sections 23B and are slidably adapted along a vertical direction 72, which is essential for allowing the assembly to be adjusted for comfortable use by persons of varying height. The upper sections 23A and the lower sections 23B preferably have a plurality of slots 24 engraved therein.

Referring to FIGS. 1, 2a, 2b, 3a, 3b and 5, the assembly 10 preferably also includes a transport platform 30 that is pivotally and directly connected, without the use of intervening elements, to a base 25 of each of the handles 22 and about the axle 21. Such a transport platform 30 may be configured to fold against the plurality of handles 22 by being articulated about a fulcrum axis 71 defined along the axle 21, which is vital and advantageous for allowing the assembly 10 to be adapted to a more compact shape for easier storage and transport thereof when the assembly 10 is not in use. The transport platform 30 preferably has a curvilinear arm 31 wrapped about a major circumference of the axle 21. Such an arm 31 may also have a gap 32 formed therein, wherein a portion of the axle 21 becomes covered and uncovered by the arm 31 during rotation of the transport platform 30.

Referring to FIGS. 1, 2a, 2b and 5, the assembly 10 may further include a horizontal support bar 26 that is monolithically formed with the plurality of handles 22. Such a horizontal support bar 26 is preferably positioned at a top of the cart assembly 10. The horizontal support bar 26 may effectively be raised and lowered along the vertical direction 72 for conveniently adjusting a height of the cart assembly 10. The horizontal support bar 26 provides the unexpected and unpredictable benefit of maintaining the parallel orientation of the plurality handles 22 with respect to each other, which is important for ensuring the assembly 10 remains stable and structurally sound during operating conditions.

Again referring to FIGS. 1, 2a, 2b and 5, the assembly 10 may also include a plurality of horizontal members 27 that form a part of the frame 20 and intermediately extend between the plurality of handles 22 below the horizontal support bar 26. Selected ones of the horizontal members 27 may include a holding ring 74. Such a holding ring 74 may be preferably mounted near the center of the horizontal members 27 which may receive and hold an object such as a beach umbrella oriented parallel to the plurality of handles 22. Each of the horizontal members 27 preferably has a plurality of hooks 40 rotatably mounted therearound and further is slidably displaced along respective longitudinal lengths 78 of the horizontal members 27. The sliding relationship of the hooks 40 in relation to the horizontal members 27 provides the unexpected and unpredictable benefit of allowing objects of varying dimensions to be suspended from the same assembly 10. Each of the hooks 40 preferably includes first 41A and second 41B telescopically connected sections 41.

The first section 41A may be directly and fixedly attached, without the use of intervening elements, to the bracket 29 (described herein below). The second section 41B is preferably slidably adapted between extended and retracted positions defined along a linear path 73. Such a linear path 73 is disposed subjacent and orthogonal to the longitudinal length of the horizontal members 27 such that a single chair is engaged from a stack of chairs when the second section 41B is adapted to the retracted position. A plurality of chairs are engaged from a stack of chairs when the second section 41B is adapted to the extended position. Each of the horizontal members 27 may further include an opening 28 formed at axially opposed sides thereof. The openings 28 may selectively be aligned with the plurality of slots 24 of the upper section 23A and the lower section 23B of the handle 22. A bracket 29 is preferably mounted about the horizontal members 27 in such a manner that the bracket 29 may simultaneously rotate along an arcuate path 79 about the horizontal members 27 while being slidably displaced along a longitudinal length 78 of the horizontal members 27 respectively.

Referring to FIGS. 1 through 4, the assembly 10 further may also include a plurality of wheels 50 that are rotatably mounted about linearly opposed ends 33 of the axle 21. Such wheels 50 are preferably positioned on a bottom surface of a rear side 34 of the transport platform 30 such that the transport platform 30 advantageously and effectively remains balanced along a horizontal plane while pivoted to a lowered position. Each of the plurality of wheels 50 may be mounted on the axle 21 of the frame 20 via a sealed bearing 35. Such a sealed bearing 35 includes a plurality of coextensively shaped ball bearings 36 that are dynamically housed therein such that the ball bearings 36 effectively freely move along a concentric path defined about the axle 21. The combination of the frame 20 and the wheels 50 provides an unpredictable and unexpected result which is not rendered obvious by one skilled in the art, wherein a user is enabled to easily and conveniently transport objects, such as chairs and the like, supported by the hooks 40 over uneven terrain, like sand, rocks and grass.

Figure 3A:
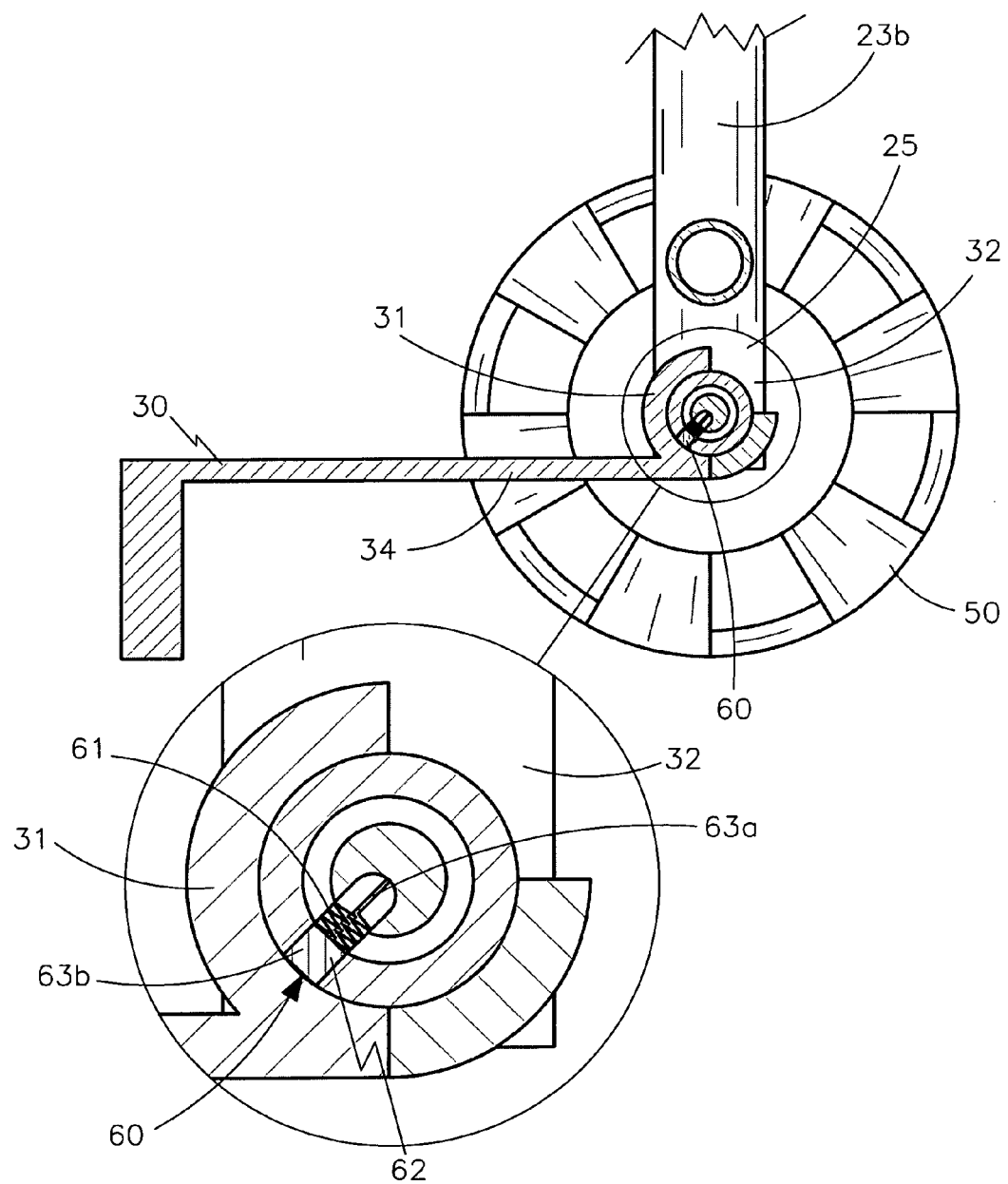
FIG. 3a is a cross-sectional view of the assembly shown in FIG. 1, taken along line 3-3, with the transport platform at a lowered position.
Figure 3B:
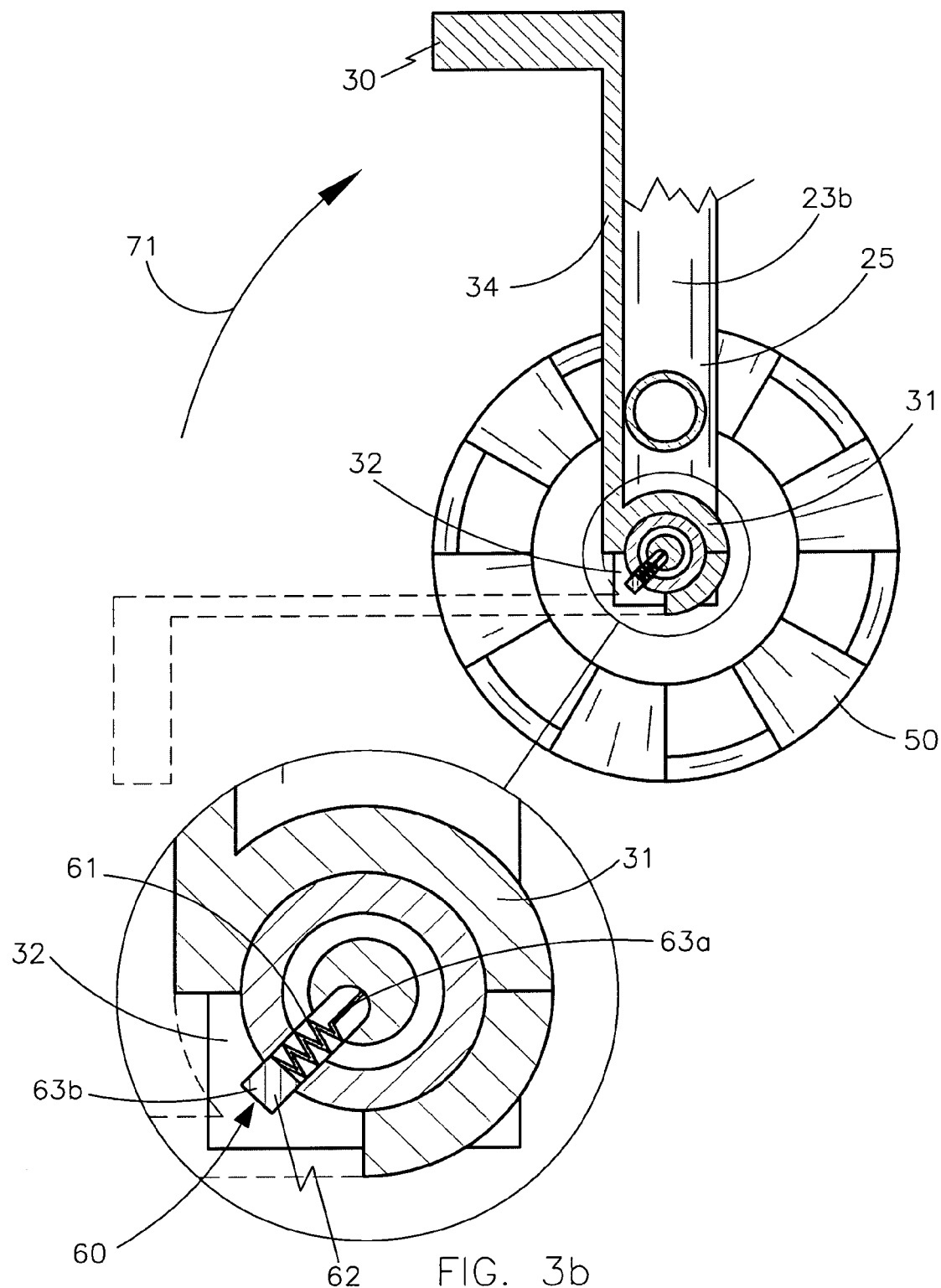
FIG. 3b is a cross-sectional view of the assembly shown in FIG. 1, taken along line 3-3, with the transport platform at a raised position.
Figure 4:
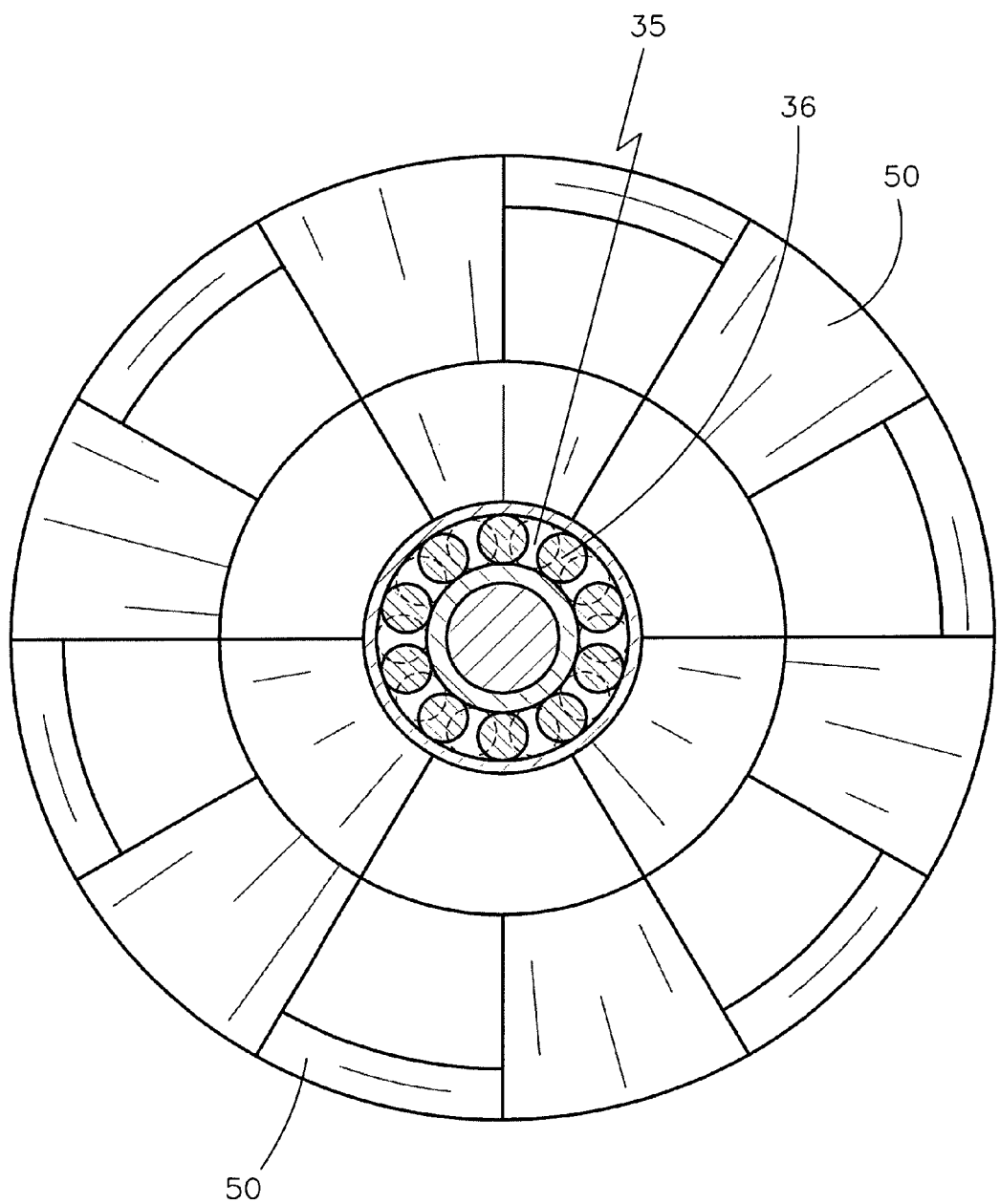
FIG. 4 is a cross-sectional view of the assembly shown in FIG. 1, taken along line 4-4.
Figure 5:
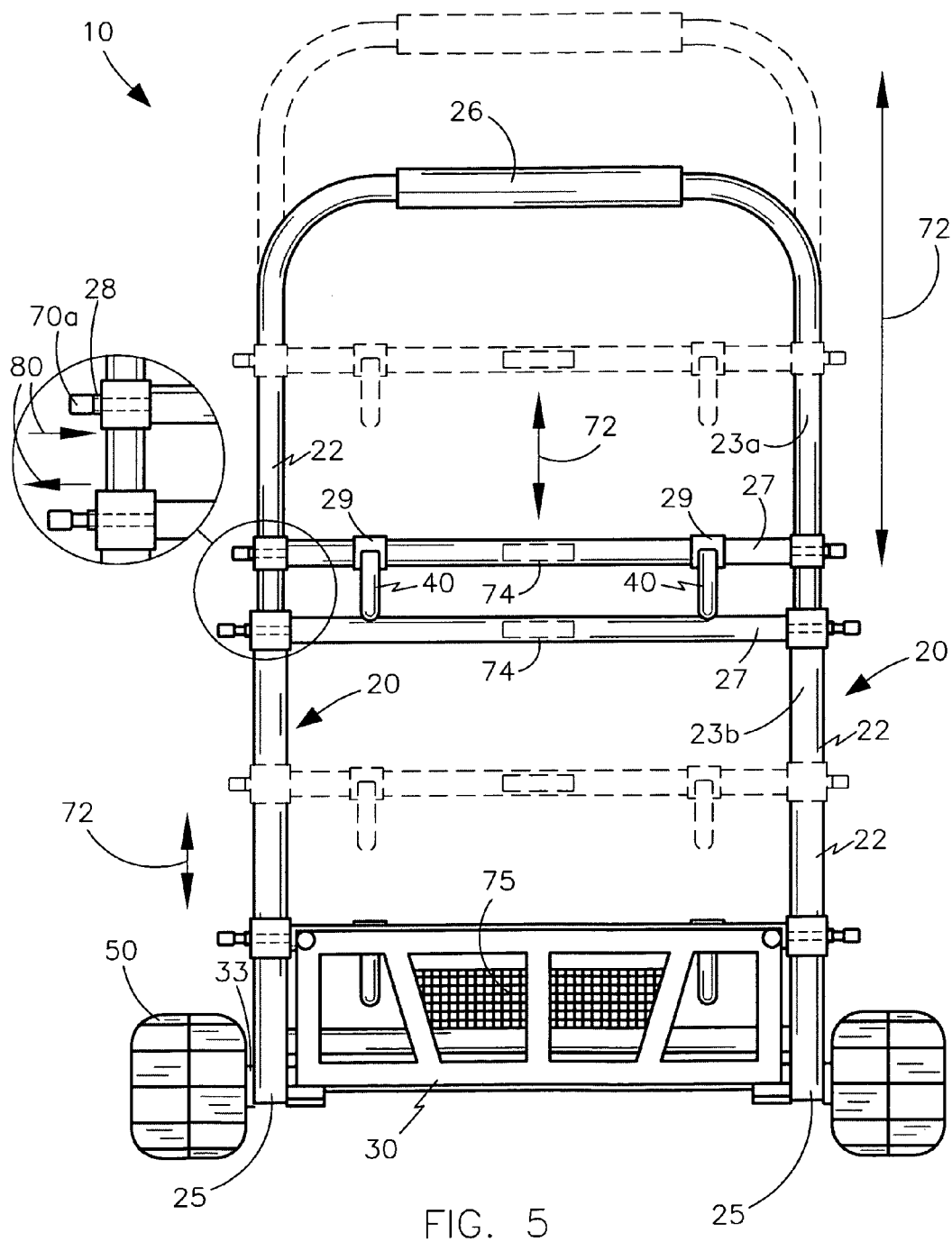
FIG. 5 is a front-elevational view of the assembly shown in FIG. 1 showing the adaptable positions of the horizontal and handle members.

Referring to FIGS. 3a and 3b, the assembly 10 preferably further includes a mechanism 60 for selectively prohibiting the transport platform 30 from biasing downwardly from a raised position. Such a selectively prohibiting mechanism 60 preferably includes a resilient spring member 61. A release pin 62 may be coupled to the spring member 61. The spring member 61 preferably has a first end 63A anchored to the axle 21 and further has an opposite second end 63B attached directly, without the use of intervening elements, to the release pin 62. The release pin 62 may be urged inwardly along a radial path to a retracted position when the portion of the axle 21 is covered by the arm 31. Such a release pin 62 travels outwardly along the radial path to an extended position when the arm 31 uncovers the portion of the axle 21. The retracted and extended positions are defined when the spring member 61 is compressed and at equilibrium respectively.

Referring to FIGS. 1, 2a, 2b and 5, the cart assembly 10 preferably further includes a plurality of locking bolts 70 that are directly and adjustably attached, without the use of intervening elements, to each of the handles 22. Such a plurality of locking bolts 70 may be adapted along respective linear travel paths 80 registered parallel to the axle 21 to effectively lock each of the handles 22 at a selected position on the frame 20. The selected position is defined at an intersection of corresponding ones of the slots 24 on the upper 23A and lower 23B sections respectively. The plurality of locking bolts 70 may further be adapted to lock each of the horizontal members 27 at a particular position on the frame 20. Selected ones 70A of the locking bolts 70 simultaneously locks the upper 23A and lower 23B sections as well as the horizontal members 27 to the frame 20 when the openings 28 are aligned with the slots 24 respectively.

Referring to FIGS. 1 through 5 again, the assembly 10 includes a frame 20 that is produced of sturdy, rust resistant materials and boasts durable components, which is essential for allowing the assembly 10 to traverse uneven surfaces, like the beach. The assembly 10 also includes a transport platform 30 and integrated adjustable handles 22. The transport platform 30 is pivotally and directly connected, without the use of intervening elements, to the base 25 of the handles 22, which is crucial and convenient for enabling the user to fold the platform 30 flush against the handles 22 when not in use, allowing for compact storage of the assembly 10. Such a platform 30 is suitably sized and shaped to easily transport a large cooler, as well as a variety of other gear.

The assembly 10 may also include a basket 75. Such, a basket 75 is fixedly coupled to a posterior side 76 of the frame 20 and situated adjacent to the base 25 of the adjustable handles 22. The basket 75 may support the bottom of an object, such a beach umbrella, while the hold holding rings 74 maintain the object at a substantially stable and substantially vertical orientation. The basket 75 may also include a sand pin 77 that may be used in conjunction with the object to provide the benefit anchoring the beach umbrella in the ground.

The adjustable handles 22 are effectively coupled by a horizontal support bar 26 at the top of the assembly 10, which can easily be raised or lowered for advantageously accommodating the height of the user. Such handles 22 include two, individual sections 23A, 23B that are telescopically connected. The upper section 23A is marginally smaller in diameter than the lower, adjacent section 23B in which it is inserted.

In one embodiment, a locking bolt 70 is directly attached, without the use of intervening elements, to either handle 22, which is important and advantageous for enabling the user to lock the handles 22 in place, once the desired height has been determined. A pair of wheels 50 are positioned on the bottom surface of the rear 34 of the base platform 30 that may measure 7¾ in diameter. Such wheels 50 may be connected to the platform 30 via threaded bolts and 4" plastic washers, for example. The wheels 50 preferably have a deep tread pattern that is vital and convenient for easy travel across sandy and uneven terrains. These wheels 50 may be produced of durable materials like, PVC plastics. PVC is a plastic polymer constructed of polyvinyl chloride, and is lightweight, weather resistant, durable and non-corrosive.

In use, a method for easily transporting a plurality of chairs includes the steps of: providing a frame 20 that has a rectilinear axle 21 extending transversely across a lower end of the frame 20 and forming sides of the frame 20 by providing a plurality of handles 22. Each of the handles 22 has an upper section 23A and a lower section 23B, and the upper sections 23A and the lower sections 23B have a plurality of slots 24 engraved therein. The method further includes the steps of telescopically connecting the upper sections 23A to the lower sections 23B by slidably adapting the upper 23A and lower 23B sections along a vertical direction 72; providing and pivotally connecting a transport platform 30 directly to a base of each of the handles 22 and about the axle 21; and folding the transport platform 30 against the plurality of handles 22. Such a step of folding the transport platform 30 includes the steps of articulating the transport platform 30 about a fulcrum axis defined along the axle 21, and providing and wrapping a curvilinear arm 31 about a major circumference of the axle 21. Such an arm 31 has a gap 32 formed therein wherein a portion of the axle 21 becomes covered and uncovered by the arm 31 during rotation of the transport platform 30 respectively.

The method also includes the steps of providing a horizontal support bar 26 that is monolithically formed with the plurality of handles 22, the horizontal support bar 26 is positioned at a top of the cart assembly 10; raising and lowering the horizontal support bar 26 along the vertical direction 72 for adjusting a height of the cart assembly 10; and providing and intermediately extending a plurality of horizontal members 27 between the plurality of handles 22 below the horizontal support bar 26 for forming a part of the frame 20. The method additionally includes the steps of providing and rotatably mounting a plurality of hooks 40 around each of the horizontal members 27 while slidably displacing the hooks 40 along respective longitudinal lengths 78 of the horizontal members 27; providing and rotatably mounting a plurality of wheels 50 about linearly opposed ends 33 of the axle 21, the wheels 50 are positioned on a bottom surface of a rear side 34 of the transport platform 30 such that the transport platform 30 remains balanced along a horizontal plane while pivoted to a lowered position; and selectively prohibiting the transport platform 30 from biasing downwardly from a raised position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A cart assembly for allowing a user to easily transport a plurality of chairs, said cart assembly comprising:
   a frame having a rectilinear axle extending transversely across a lower end of said frame;
   a plurality of handles forming sides of said frame, each of said handles having an upper section and a lower section, said upper sections being telescopically connected to said lower sections and slidably adapted along a vertical direction, said upper sections and said lower sections having a plurality of slots engraved therein;
   a transport platform pivotally and directly connected to a base of each of said handles, said transport platform being configured to fold against said plurality of handles by being articulated about a fulcrum axis defined along said axle;
   a horizontal support bar monolithically formed with said plurality of handles, said horizontal support bar being positioned at a top of said cart assembly, said horizontal support bar being raised and lowered along the vertical direction for adjusting a height of said cart assembly;

a plurality of horizontal members forming a part of said frame and intermediately extending between said plurality of handles below said horizontal support bar, each of said horizontal members having a plurality of hooks rotatably mounted therearound, in a manner allowing said hooks to rotate around said horizontal members, and further being slidably displaced along respective longitudinal lengths of said horizontal members; and a plurality of wheels rotatably mounted about linearly opposed ends of said axle, said wheels being positioned on a bottom surface of a rear side of said transport platform such that said transport platform remains balanced along a horizontal plane while pivoted to a lowered position.

2. The cart assembly of claim 1, wherein each of said horizontal members further comprises: an opening formed at axially opposed sides thereof, said openings being selectively aligned with said plurality of slots of said upper section and said lower section of said handle.

3. The cart assembly of claim 1, wherein said cart assembly further comprises: a plurality of locking bolts directly and adjustably attached to each of said handles, said plurality of locking bolts being adapted along respective linear travel paths registered parallel to said axle to lock each of said handles at a selected position on said frame, said selected position being defined at an intersection of corresponding ones of said slots on said upper and lower sections respectively.

4. The cart assembly of claim 3, wherein said plurality of locking bolts are further adapted to lock each of said horizontal members at a particular position on said frame, wherein selected ones of said locking bolts simultaneously locks said upper and lower sections as well as said horizontal members to said frame when said openings are aligned with said slots respectively.

5. The cart assembly of claim 1, wherein each of said hooks comprises:

first and second telescopically connected sections; and a bracket mounted about said horizontal members in such a manner that said bracket is simultaneously rotatable about said horizontal members while being slidably displaced along a longitudinal length of said horizontal members respectively.

6. The cart assembly of claim 5, wherein said first section is directly and fixedly attached to said bracket, said second section being slidably adapted between extended and retracted positions defined along a linear path, said linear path being disposed subjacent and orthogonal to said longitudinal length of said horizontal members such that a single chair is engaged from a stack of chairs when said second section is adapted to said retracted position;

wherein a plurality of chairs are engaged from a stack of chairs when said second section is adapted to said extended position.

7. The cart assembly of claim 1, wherein each of said plurality of wheels is mounted on said axle of said frame via a sealed bearing, said sealed bearing including a plurality of coextensively shaped ball bearings dynamically housed therein such that said ball bearing freely move along a concentric path defined about said axle.

8. A cart assembly for allowing a user to easily transport a plurality of chairs, said cart assembly comprising:

a frame having a rectilinear axle extending transversely across a lower end of said frame;

a plurality of handles forming sides of said frame, each of said handles having an upper section and a lower section, said upper sections being telescopically connected to said lower sections and slidably adapted along a vertical direction, said upper sections and said lower sections having a plurality of slots engraved therein;

a transport platform pivotally and directly connected to a base of each of said handles and about said axle, said transport platform being configured to fold against said plurality of handles by being articulated about a fulcrum axis defined along said axle, said transport platform having a curvilinear arm wrapped about a major circumference of said axle, said arm having a gap formed therein wherein a portion of said axle becomes covered and uncovered by said arm during rotation of said transport platform;

a horizontal support bar monolithically formed with said plurality of handles, said horizontal support bar being positioned at a top of said cart assembly, said horizontal support bar being raised and lowered along the vertical direction for adjusting a height of said cart assembly;

a plurality of horizontal members forming a part of said frame and intermediately extending between said plurality of handles below said horizontal support bar, each of said horizontal members having a plurality of hooks rotatably mounted therearound, in a manner allowing said hooks to rotate around said horizontal members, and further being slidably displaced along respective longitudinal lengths of said horizontal members;

a plurality of wheels rotatably mounted about linearly opposed ends of said axle, said wheels being positioned on a bottom surface of a rear side of said transport platform such that said transport platform remains balanced along a horizontal plane while pivoted to a lowered position; and means for selectively prohibiting said transport platform from biasing downwardly from a raised position.

9. The cart assembly of claim 8, wherein said selectively prohibiting means comprises:

a resilient spring member; and a release pin coupled to said spring member;

wherein said spring member has a first end anchored to said axle and further has an opposite second end attached directly to said release pin, said release pin being urged inwardly along a radial path to a retracted position when said portion of said axle is covered by said arm, said release pin traveling outwardly along the radial path to an extended position when said arm uncovers said portion of said axle;

wherein said retracted and extended positions are defined when said spring member is compressed and at equilibrium respectively.

10. The cart assembly of claim 8, wherein each of said horizontal members further comprises: an opening formed at axially opposed sides thereof, said openings being selectively aligned with said plurality of slots of said upper section and said lower section of said handle.

11. The cart assembly of claim 8, wherein said cart assembly further comprises: a plurality of locking bolts directly and adjustably attached to each of said handles, said plurality of locking bolts being adapted along respective linear travel paths registered parallel to said axle to lock each of said handles at a selected position on said frame, said selected position being defined at an intersection of corresponding ones of said slots on said upper and lower sections respectively.

12. The cart assembly of claim 11, wherein said plurality of locking bolts are further adapted to lock each of said horizontal members at a particular position on said frame, wherein selected ones of said locking bolts simultaneously locks said upper and lower sections as well as said horizontal members to said frame when said openings are aligned with said slots respectively.

13. The cart assembly of claim 8, wherein each of said hooks comprises:
   first and second telescopically connected sections; and
   a bracket mounted about said horizontal members in such a manner that said bracket is simultaneously rotatable about said horizontal members while being slidably displaced along a longitudinal length of said horizontal members respectively.

14. The cart assembly of claim 13, wherein said first section is directly and fixedly attached to said bracket, said second section being slidably adapted between extended and retracted positions defined along a linear path, said linear path being disposed subjacent and orthogonal to said longitudinal length of said horizontal members such that a single chair is engaged from a stack of chairs when said second section is adapted to said retracted position;
   wherein a plurality of chairs are engaged from a stack of chairs when said second section is adapted to said extended position.

15. The cart assembly of claim 8, wherein each of said plurality of wheels is mounted on said axle of said frame via a sealed bearing, said sealed bearing including a plurality of coextensively shaped ball bearings dynamically housed therein such that said ball bearing freely move along a concentric path defined about said axle.

16. A method for easily transporting a plurality of chairs, said method comprising the steps of:
   a. providing a frame having a rectilinear axle extending transversely across a lower end of said frame;
   b. forming sides of said frame by providing a plurality of handles, each of said handles having an upper section and a lower section, said upper sections and said lower sections having a plurality of slots engraved therein;
   c. telescopically connecting said upper sections to said lower sections by slidably adapting said upper and lower sections along a vertical direction;
   d. providing and pivotally connecting a transport platform directly to a base of each of said handles and about said axle;
   e. folding said transport platform against said plurality of handles by performing the following steps
      i. articulating said transport platform about a fulcrum axis defined along said axle, and
      ii. providing and wrapping a curvilinear arm about a major circumference of said axle, said arm having a gap formed therein wherein a portion of said axle becomes covered and uncovered by said arm during rotation of said transport platform respectively;
   f. providing a horizontal support bar monolithically formed with said plurality of handles, said horizontal support bar being positioned at a top of said cart assembly;
   g. raising and lowering said horizontal support bar along the vertical direction for adjusting a height of said cart assembly;
   h. providing and intermediately extending a plurality of horizontal members between said plurality of handles below said horizontal support bar for forming a part of said frame;
   i. providing and rotatably mounting a plurality of hooks around each of said horizontal members in a manner allowing said hooks to rotate around said horizontal members while slidably displacing said hooks along respective longitudinal lengths of said horizontal members;
   j. providing and rotatably mounting a plurality of wheels about linearly opposed ends of said axle, said wheels being positioned on a bottom surface of a rear side of said transport platform such that said transport platform remains balanced along a horizontal plane while pivoted to a lowered position; and
   k. selectively prohibiting said transport platform from biasing downwardly from a raised position.

\* \* \* \* \*